United States Patent Office 3,219,537
Patented Nov. 23, 1965

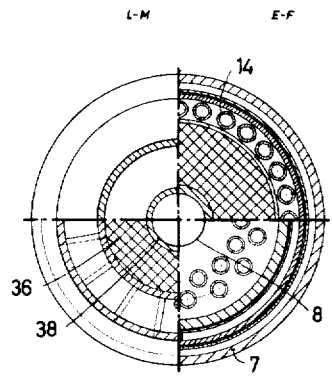
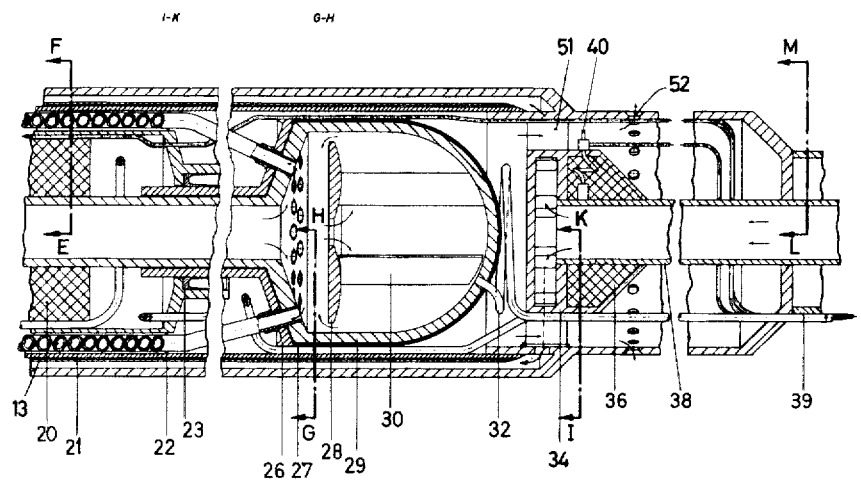
Fig. 2
Fig. 1

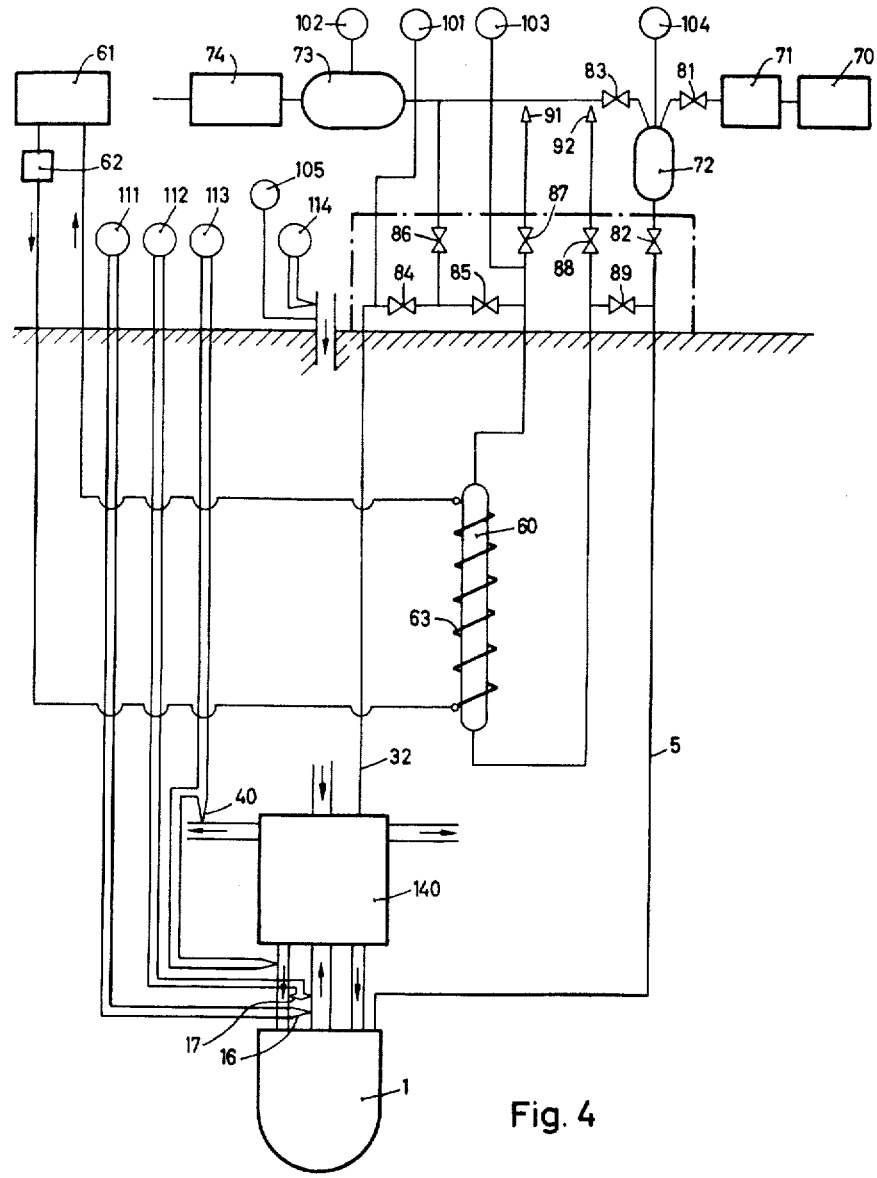

3,219,537
NUCLEAR REACTOR FOR UNDERGROUND INSTALLATION IN DRILL HOLES
Karl Janner, Wolfgang Braun, and Franz Winkler, Erlangen, Germany, assignors to Siemens-Schuckertwerke Aktiengesellschaft, Berlin-Siemensstadt and Erlangen, Germany, a corporation of Germany
Filed May 22, 1963, Ser. No. 282,490
Claims priority, application Germany, May 23, 1962,
S 79,573
11 Claims. (Cl. 176—19)

Our invention relates to nuclear reactors and particularly to nuclear reactors for installation underground in drill holes or shafts.

The increasing demands for energy, in view of the limited reserves of fossil fuels, have resulted in attempts to better exploit the available fuel deposits. Thus, subterraneous coal seams have been gasified at their location. Dried-up oil wells have been made further exploitable by heating the oil-bearing earth strata. In this connection, it has been suggested to heat the strata by controlled use of atomic fission energy, however such a method, due to high costs and complexity of equipment, has been found in the past to be economically infeasible.

It is accordingly an object of our invention to provide a nuclear reactor for underground installation in drill holes in which the nuclear reactor equipment necessary for heating the mineral-bearing strata or the like is comparatively simple and inexpensive.

It is another object of our invention to permit sinking drill holes and preparing them for underground installation of nuclear reactors at low cost.

It is also an object of our invention to provide such an underground installation of a nuclear reactor that will avoid destructive radioactive contamination of the subsoil or the mineral to be extracted, such as oil for example.

Still another object of our invention is to provide a homogeneous reactor for underground installation in drill holes in which the charge of fuel is small and can be fed and salvaged with simplicity, and which requires no moving parts such as control and regulating devices, especially.

In accordance with the invention, we provide a nuclear reactor for underground installation in drill holes or shafts assembled with a cylindrical heat exchanger which is traversed by a secondary medium, for example an underground natural fluid, preferably in crossed counter-flow with respect to the flow of a primary medium. The reactor is a self-stabilized homogeneous reactor with reflector and radiation shield means. The primary medium is a nuclear fuel solution which circulates through the assembly, preferably by natural, i.e. thermo-siphon action. Operative connections between the reactor and heat-exchanger unit underground and the above-ground installations of the plant are provided by thin flexible tube lines for the fuel solution and for protective gas respectively, aside from electrical measuring leads that are connected to monitoring sensors, for example thermocouples, in the assembly.

The dimensions of a reactor constructed in accordance with the invention must fit the narrow diameter of the drill hole; therefore, in accordance with another feature of our invention, the drill hole is widened coaxially at its bottom so that a space or chamber with a larger diameter is then made available. This enlargement of the drill hole makes it possible to install a reactor of larger diameter at the installation site. The reactor proper, which toward the outside is essentially made up of the vessel and the reflector surrounding the reactor, can then be put together for the first time at the site. To accomplish this, the reflector is lowered in separate portions into the drill hole in such a manner that the portions lock themselves together upon entering the drill hole enlargement into a widened casing-shaped structure into which the reactor vessel is then inserted. The energy arising in the homogeneous reactor which is constructed in accordance with our invention must be led away toward the outside with the aid of a heat exchanger. Accordingly, a nuclear fuel solution or a vaporous constituent thereof in the primary loop of the assembly is caused to flow through the heat exchanger, and a medium suitable for heating the underground earth strata, for example water, gas or mineral oil, is caused to flow through the secondary loop. In accordance with the particular intended use of such a reactor, a medium located at the site can serve this purpose. However, the secondary cooling medium can also be brought down from the surface of the earth to the installation site. The heat exchanger which is structurally tightly secured to the reactor proper, cannot be of conventional construction because of space considerations and in order to permit a natural flow which ensures the necessary heat conductance. A type of cylindrical casing structure is accordingly selected which is suitable for the walls of the drill hole.

Such a homogeneous reactor can be operated together with a heat exchanger in accordance with the principle of a boiling water reactor or a pressurized water reactor.

The foregoing and other objects, advantages and features of our invention will be apparent from the preferred embodiment illustrated by way of example on the accompanying drawings in conjunction with the following detailed description. In the drawings:

FIG. 1 is a longitudinal section partly broken away of the upper portion of a homogeneous reactor constructed in accordance with the invention;

FIG. 2 is a composite transverse section thereof, the left upper quadrant, left lower quadrant, right upper quadrant and right lower quadrant being taken respectively along the lines L–M, I–K, E–F and G–H in FIG. 1 in the direction of the arrows;

FIG. 4 shows schematically the reactor constructed in accordance with the invention in assembly with auxiliary equipment located above and below ground.

Figure 3:
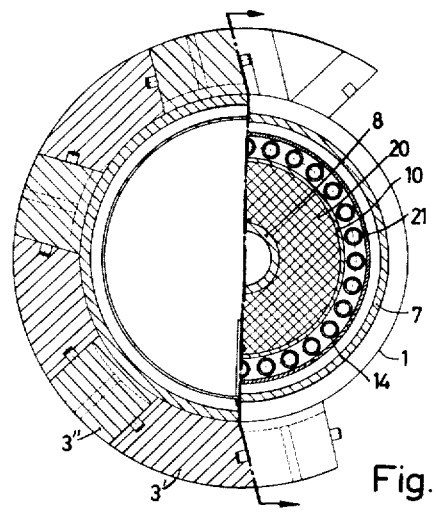
FIG. 3 is another composite transverse section in which the left half and right half respectively are taken along the lines A–B and C–D in FIG. 1a in the direction of the arrows.
Figure 1A:
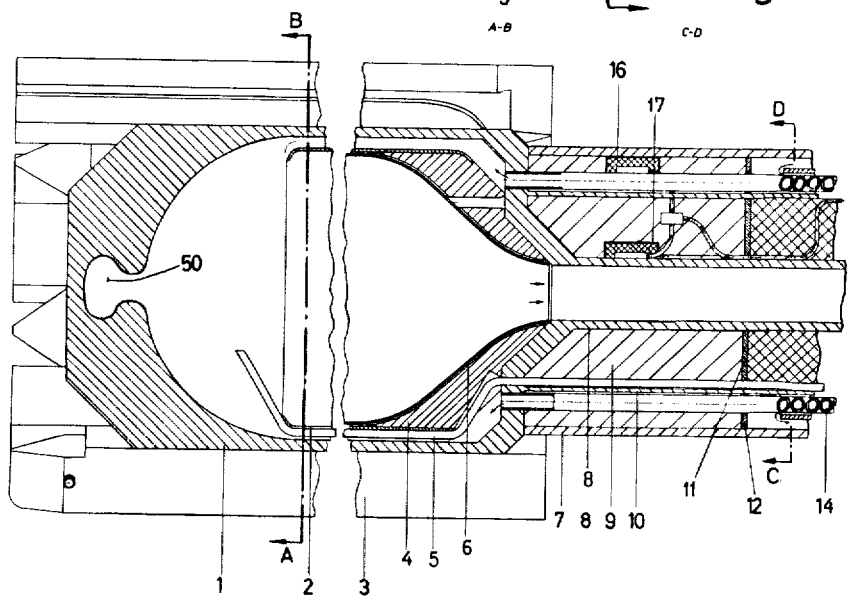
FIG. 1a is a longitudinal section partly broken away of the lower portion complementing the upper portion of the reactor shown in FIG. 1.

Referring now to the drawings and particularly to FIGS. 1 and 1a it can be seen that the homogeneous solution pressure reactor of the present invention includes a reactor vessel 1 made of steel and having a substantially cylindrical shape and a reinforced base, which is formed internally with a pocket-shaped recess 50. The vessel 1 is surrounded by a separate reflector 3 which, only after having been installed in a drill hole in the ground, assumes its cylindrical shape within an enlarged or widened portion of the drill hole. The reflector 3 serves the purpose of scattering back into the fuel zone any stray neutrons that attempt to escape. Since the emerging neutrons in the case at hand have predominantly epithermal energy and the vessel wall readily absorbs thermal neutrons, it is advisable to select a reflector material with small elastic retarding capability and large reflecting capability of epithermal neutrons. Examples of such materials are nickel, iron and lead. A suitable thickness for iron is 70 millimeters, for example. The introduction of this reflector into the widened drill hole, which afterwards serves as the reactor chamber, can be effected somewhat in the following manner:

The hollow cylinder of the reflector 3 is divided into twelve segments. As shown in FIG 3, these segments are of two different types, segments 3' that are wedge shaped, having bevelled non-parallel sides, and segments 3" that have parallel sides. The wedge-shaped and parallel side blocks or segments are alternately arranged and, as viewed in the radial direction shown in FIG. 3, form an unbroken ring. The blocks with parallel side surfaces carry a guide pin on those surfaces which abut the bevelled surfaces of the wedge-shaped blocks so that the guide pins are able to slide into the corresponding grooves in the side surfaces of the adjacent wedge-shaped blocks. For the construction in the drill hole, six similar segments are arranged in each of two bundles lying one over the other around a pipe so that the bevelled ends engage one another. The parallel side blocks form the upper bundle and the wedge-shaped blocks form the lower bundle. The lower bundle rests on a plate (not shown) which is secured to the end of the pipe. The blocks of the upper bundles stand with their inner recesses on a ring (not shown), the inner recesses extending from below to only slightly over the end of the prismatic roof formed by the bevelling, the ring being shiftable downwardly against the supporting pipe under additional loading. The blocks of both bundles are secured in position by resilient steel bands while they are being introduced into the drill hole. When the pipe has reached the end of the drill hole with both bundles, then an additional loading is applied to the upper bundle whereby it confiningly shoves the supporting ring downwardly into the lower bundle. Thereby only the engaging ends of the bundle are next pressed toward the outside, until they lie up against the wall of the widened drill hole. At the same time, the guide pins of the upper blocks are gripped by the grooves of the lower blocks which are widened at the top. If the upper bundle is now further pressed downwardly, the pins will glide along the grooves and the blocks of the lower bundles will also thereby be pressed outwardly in their lower portion until they finally stand substantially vertically. If the lower ends of the blocks of the upper bundle are stood up on the floor or base of the drill hole, the introduced pipe can then be withdrawn. The inwardly inclined slanting blocks of the upper bundles can then be pressed outwardly with a cone or by the introduction of the lower wedge-shaped end of the reactor vessel and can be brought to their final position.

By this method of installation and construction of the reflector 3, the back drilling of the drill hole must extend upwardly somewhat twice as far as the height of the reflector. This would not be necessary if the hollow steel cylinders were formed by introducing into the drill hole narrowly wound resilient sheet steel which is permitted to spring apart at the desired location. This method has a disadvantage, however, in that oil or water inclusions can form which considerably impair the reflecting capability.

A further method of construction consists of casting the reflector in position out of lead or another suitable metal. Of course, to do so a subsequently removable core must be installed. It is also possible to employ a reflector of liquid metal instead of a solid reflector.

The reactor vessel 1, before installation, is assembled together with the other portions of the reactor, such as the heat exchanger and the like, into a single solid package and after construction of the side reflectors 3, is lowered into the drill hole. The vessel 1 contains a homogeneous nuclear fuel solution which is caused to circulate while the reactor is in operation only as a result of the changes in the solution density caused by the particular temperature across a heat-exchanger pipe 14 with which the reactor nucleus is tightly connected. Thus, a so-called natural circulation takes place in the reactor.

Within the reactor vessel 1, in front of the middle central outlet to which a stand pipe 8 is connected, there is disposed a conical shield 4 of reflective material. The shield 4 and the upper part of the vessel wall together form the upper part of the reflector. The shield 4 is disposed toward the interior to shield this portion of the vessel and especially the inlets of the cooling pipe against too great a flow of neutrons and thereby to protect against its damaging effects.

A baffle plate 2, which extends downwardly to the lower part of the reactor container, is carried on the outside of the conical shield 4. It serves to turn back the flow of the cooled homogeneous solution of the heat exchanger. This solution flows through a plurality of down pipes 14 symmetrically arranged with respect to the stand pipe 8 in a peripheral zone of the upper portion of the reactor vessel. The vessel wall is accordingly maintained at a relatively lower temperature and its mechanical properties are not impaired. The baffle plate 2 also serves as a protection against the deposition of corrosion products, and the intermixture of the entering cold nuclear fuel solution with the rising hot solution in the vessel is prevented. The mean temperature in the reactor vessel itself, therefore, also remains relatively low. Partial overheating of the nuclear fuel solution is also thereby safely avoided. This flow guidance is also assisted by a heat-insulating sheet 6 mounted inside the shield 4 and spaced slightly from the latter. The insulating sheet 6 retards partial heat balancing between the outwardly flowing and the inwardly flowing streams of nuclear fuel and thereby also limits the formation of vertical circulations, a matter of considerable importance for maintaining even heat distribution within the stream of fission products. Because of this, resistance to the inflow of the nuclear fuel solution into the stand pipe 8 is thereby diminished. The heat-insulating sheet 6 is secured to the shield 4 in a known manner, for example with spacer bolts (not shown), so that the actual heat-insulating layer is formed by the greatly slowed down nuclear fuel stream in the space between the heat-insulating sheet 6 and the shield 4. For further improvement in the temperature of the upper portion of the reactor vessel it is obviously also possible, as a variation of the embodiment shown in FIGS. 1 and 1a, to provide a heat-insulating space between the sheet 6 and the shield 4.

A nuclear fuel feed pipe 5 (with an inner diameter of about 3 millimeters) is arranged in the annular space between the baffle plate 2 and the vessel wall. It ends in the lower half of the reactor vessel, but above the floor of the latter, so that it cannot be obstructed by any possible deposits, and is secured to the baffle plate 2 in the annular space so as to avoid possible contact thereof with the vessel casing and possible consequential damage to the corrosion-protective layer formed on the vessel wall. In the deepest part of the reactor vessel 1, the afore-mentioned settling pocket 50 is provided for possible deposits that might develop and which thereby makes possible the production of less flow density in the region. Local overheating due to some nuclear fuel granule that may be present is also thereby avoided. Besides the foregoing, the deposits are removed from the path of the stream. In the region of the settling pocket 50 there can additionally be installed structure of neutron absorbing material for diminishing the neutron flow, thereby avoiding overheating of the deposited substance and also a particularly strong corrosive action which may be a possible consequence thereof.

The heat exchanger is arranged above the reactor core proper and a shielding space 9 is interposed therebetween. The space 9 contains a moderating and absorbing substance, for example a mixture of boron carbide and zirconium hydride, by means of which the neutron flux density outside the vessel and the consequent reactivity and corrosion are lessened. Furthermore, the temperature transitions between the auxiliary parts on the one hand, which have a temperature close to the entering temperature of the oil, and the vessel on the other hand are less abrupt. Also, the temperature probes, for example the thermocouple elements 16 and 17, which are provided in this zone 9 for measuring the inlet and outlet temperature of the nuclear fuel solution in the reactor vessel proper and for permitting control of the warm-up time in the primary circuit, are thereby particularly protected. This shielding zone 9, which extends between the inner stand pipe 8 and an outer protective pipe 7, which is also solidly secured to the reactor vessel 1, is closed at the top by a main plate 11 and an annular plate 12. A heat-insulating zone 20, containing quartz foam for example, and surrounded by a cylindrical heat exchanger arrangement is provided adjacent the plates 11, 12. The heat-exchanger arrangement has the task of conducting the heat absorbed by the primary heat carrier in the reactor core, i.e. the nuclear fuel solution, to the secondary heat carrier, for example natural mineral oil. The heat exchanger forms a unitary construction with the reactor vessel and, because of the small cross section of the drill hole, possesses a length of several meters. The essential component parts of the heat exchanger are next to the stand pipe 8 through which the hot nuclear fuel solution reaches a distributor head 29 and down pipes 14 connected to the latter. These parts are located between the outer protective pipe 7 and an inner cylindrical pipe 10 which is connected to a casing 26 across a preferably oil-tight gasket 23, the casing 26 surrounding the lower part of the distributor head 29 and being separated therefrom by an intervening heat-insulating layer 27. This casing 26 serves also simultaneously as an absorber of thermal neutrons, so that the ring-shaped space formed by this construction beneath the distributor head 29, which is filled with a secondary medium such as oil that is to be heated, is penetrated primarily by a non-reactive radiation, such as gamma radiation. This radiation can thereby be simultaneously useful for achieving radiochemical effects such as increasing the viscosity for example.

A further reduction in reactivity of the secondary coolant can be achieved by the additional installation of neutron absorbing material in this space. This space can be made smaller or enlarged in accordance with the importance of such effects on the secondary medium which is to be warmed, that is, with stream conduit equipment well known in the art in which the flow-through time and thereby the radiation time are diminished. Supplementary thereto, the drill hole can be widened accordingly at these places. Stream conduit equipment with an increased flow-through duration, for example in the shape of a resilient sheet-metal spiral, which is connected with the outlet openings for the secondary coolant placed at this elevation can then be provided. The distributor head 29 divides the rising fission products stream equally among the down pipes 14, which also serve simultaneously as heat exchange pipes. The down pipes 14 run helically in an annular space between the pipe 10 and a coaxial outer pipe 21 in a downward direction. Stresses resulting from unequal heat expansion of the various construction elements are thereby fully avoided.

The radial position of the pipes 14 in this space between the walls of pipes 10 and 21 is fixed therein by four spacer supports 22 that are band shaped and are formed with bores at the location of the pipes 14, which also run helically with an oppositely directed pitch or gradient in a vertical direction in the pipes and lead the streams of oil vertically to the down pipes. Particularly effective heat transfer is thereby achieved. The previously mentioned pipe 21, which is surrounded by a sheet-metal cylinder 13 slightly spaced therefrom for heat insulation, leads the entering medium, for example oil, which is above the heat exchanger and the distributor chamber 34 mounted thereon, along the inner side of the outer pipe 7 in a downward direction and then by counterflow principle transversely to the down pipes again in a helical manner in an upward direction. The heated medium then flows around the distributor head 29 and leaves through the axially parallel bores 51 of the distributor chamber 34 and also through the bores 52 in the sides of the outer protective pipe 7 into the outer drill hole. Oil feed is effected through the central pipe 38 which is connected to the distribution chamber 34. The latter is formed with radial channels for conveying the cold secondary medium into the previously mentioned ring-shaped space between the pipes 7 and 21. Above this distribution chamber 34, a heat-insulating layer 36 is located in which a temperature measurement device 40 for measuring the heating range of the secondary medium is arranged. The measurement leads of all the temperature probes are brought together above the distribution chamber with the feed pipe 5 of the homogeneous solution and a protective gas feed pipe 32 to one bundle and secured to the supporting pipe 39 with which the assembled reactor arrangement is sunk into the drill hole. These leads are the only connection between the reactor during its operation and the surface of the earth. In addition, the pipe 38 can also be led up to the surface of the earth as is shown in FIG. 4 if the secondary cooling medium is not or cannot be removed at the installation site of the reactor.

The protective gas feed pipe 32 opens into the distribution head after passing through a heat expansion spiral, the distribution head serving at the same time to maintain the pressure for the entire reactor system. The protective gas has another purpose besides this to compensate for the loss of oxygen from the fission products solution which is caused by corrosion phenomena. In this case, accordingly, pure oxygen with the addition of an inert gas, for example helium, may be utilized.

The plate 28 mounted in the distributor head on a supporting bracket 30 has the function of ensuring change of direction of the nuclear fuel stream with as little loss as possible and is capable, nevertheless, of permitting an effective absorption of oxygen through the nuclear fuel solution.

In order to operate the reactor, that is, to control, inspect and maintain it, auxiliary equipment is needed besides that which is shown in FIGS. 1 to 3. A schematic view of the necessary auxiliary and measurement apparatuses is shown in FIG. 4 with the exception of measurement apparatuses for radiation control such as recording and warning apparatuses. It is of course readily understood from FIG. 4 which portions of the installation are located above the ground, represented by the horizontal line and adjacent shading, and which are below the ground. Those valves and conduits located above the ground which convey radioactive material and which must therefore be shielded are shown enclosed by a dot-and-dash line in the figure.

The following operations are performed with these apparatuses:

Pouring-in the fuel solution

Before beginning the pouring operation, the reactor 1, the heat exchanger 140, a decay storage tank 60 and the conduits are filled with a suitable protective gas at a pressure so chosen that after the succeeding fuel-filling operation the precise operating pressure is achieved. In the fuel-filling operation, a predetermined quantity of the fuel solution is conveyed from a source 70 by means of a pump 71 through a valve 81 into a metering tank 72. This quantity of fuel solution is transported by the high-pressure gas in a pressure tank 73, which is fed from a gas supply 74, through the fuel conduits 5 into the reactor vessel when valves 81, 89 and 86 are closed and valves 82 and 83 are opened. This procedure is repeated for successive predetermined quantities of the fuel solution until the reactor 1 and the heat exchanger 140 are filled. The criticality of the reactor as well as its desired efficiency are achieved by altering the fuel concentration in the individual charges or quantities. In a similar manner, the change in reactivity due to thermal processing loss and contamination is compensated for. The unusually large negative temperature coefficient of this reactor permits the starting-up of the reactor without any other control. The decay storage tank 60 is evacuated after the first filling operation is completed by closing valves 85, 88 and 89. Filling with concentrated fuel solution can then take place in a similar manner. During the operation of the reactor so as to compensate for the thermal processing loss and contamination. The spent and now radioactive protective gas is then led into the decay storage tank 60.

*Recovery of the fuel solution*

The fuel solution and protective gas are strongly radioactive at the end of the operating period and consequently expensive protective measures would be required for transporting the same. The decay storage tank 60 is accordingly provided under the ground, although not too deeply thereunder, so that the solution may be kept in the tank 60 for a period of a few weeks until the intensive, though short-life, radiation is dissipated.

In the recovery operation, the valve 89 is opened after the valves 82, 88, 87, 84 and 85 have been closed. A portion of the solution is then forced by the compressed protective gas in the distributor head 29 through the conduit 5 into the decay storage tank 50. If the valves 86 and 84 are thereafter opened, then the balance of the solution, except for a small remainder which is retained in the reactor because the surface of the liquid has sunk below the level of the inlet opening of the pipe 5, is forced by the gas in the pressure tank 73 into the decay storage tank 60. A portion of the fuel remaining therein is nevertheless recoverable by diluting the remainder of the solution. The fuel solution should be withdrawn through the fuel outlet conduit. After the valves 88, 85 and 86 are opened and valves 87, 89 and 84 are closed, the solution is forced out of the decay storage tank 60 by the gas in the pressure tank 73. The tank 60 is so long that the solution is thereby precluded from going critical. Furthermore, it is surrounded by neutron-absorbing media so that no critical arrangement can take place in the event of a leak. The heat arising due to radioactive disintegration in the decay storage tank 60 is led away for dissipation into the atmosphere by means of a special cooling system comprising, for example, an air cooler 61, a pump 62 and a cooling coil 63, or can also be directly given off to the surrounding earth in which the decay storage tank 60 is buried.

*Pressure measurement*

The operating pressure on the primary side is indicated by a pressure gauge 101 and on the secondary side by a pressure gauge 105. Both pressure values together with other measurement values are continuously recorded by a multiple recorder (not shown). Pressure gauges 102, 103 and 104 serve as indicators for regulation of pressure in the pressure tank and metering tank while carrying out the various operations.

*Temperature measurement*

Instruments 111, 112, 113 and 114 indicate respectively the temperature of the fuel solution at the outlet of the vessel, the heating range of the fuel solution, the heat range of the oil and the temperature of the oil before its entrance into the drill hole. These values are also continuously recorded by a multiple recorder (not shown).

Naturally, many measurement and recording instruments may be provided, besides the foregoing, for continuous inspection of the conveyed medium. In addition, warning signal mechanisms may also be provided which are actuated by unusual increases in pressure and temperature in the primary and secondary loops as well as increases in radioactivity of the medium and air that are supplied.

It must of course be taken into consideration that, except for the recovery of the charge of nuclear fuel in a nuclear reactor that is installed underground in drill holes in accordance with the invention, salvaging of the nuclear reactor proper is probably not economically justifiable in the event of a reactor accident, particularly since the drill hole or shaft must be sealed to avoid danger of contamination.

It is also within the scope of our invention that where local conditions permit, heterogeneous thermal reactors or fast reactors may be used for a similar purpose as the homogeneous pressurized solution reactor described herein.

While the invention has been illustrated and described as embodied in a nuclear reactor that is inserted in a drill hole underground, it is not intended to be limited to the details shown since various modifications and structural changes may be made without departing in any way from the spirit of the present invention. Other adaptations should and are intended to be comprehended within the meaning and range of the equivalents of the following claims.

We claim:

1. A nuclear reactor assembly for underground installation in a drill hole or shaft, comprising a self-stabilized homogeneous nuclear reactor having reflector means and radiation-shield means and being mounted at an underground location, a heat exchanger joined with said reactor at said location and forming an underground unit together therewith, said unit having a circulatory primary flow path for nuclear fuel solution extending through said reactor and exchanger, said exchanger having a secondary flow path with external secondary liquid to be heated subterraneously, gas-duct means in said unit for protective gas, a plurality of sensors responsive to reactor operation and located at different points of said unit, electrical signal leads connected to said respective sensors and extending upwardly to above ground; and flexible tube means extending upwardly to above ground from said primary flow path for said fuel solution and from said gas-duct means.

2. A nuclear reactor assembly for underground installation in a drill hole or shaft, comprising a self-stabilized homogeneous nuclear reactor having reflector means and radiation-shield means and being mounted at an underground location, a substantially cylindrical heat exchanger coaxially joined with said reactor at said location and forming an underground unit together therewith, circulation means forming a primary flow path in said nuclear reactor and said heat exchanger for circulating nuclear fuel solution therethrough, said exchanger having a secondary flow path with external secondary liquid to be heated subterraneously, gas-duct means for protective gas in said unit; a plurality of temperature-responsive sensors at different respective points in said unit; electrical signal leads connected to said respective sensors and extending upwardly to above ground; and flexible tube means extending upwardly to above ground from said primary flow path for said fuel solution and from said gas-duct means.

3. A nuclear reactor assembly for underground installation in a drill hole or shaft, comprising a self-stabilized homogeneous pressurized solution nuclear reactor having reflector means and shield means and being mounted at an underground location; heat-exchanger means joined with said reactor at said location and forming a unit therewith; primary flow path means in said nuclear reactor and heat-exchanger means unit for naturally circulating a nuclear fuel solution through the same; secondary flow path means in said heat exchanger means for circulating a secondary fluid in counterflow with respect to the flow of said nuclear fuel solution through said primary flow path means; gas-duct means for conveying oxygenated protective gas in said assembly for maintaining the pressure therein and for replacing oxygen lost from said nuclear fuel solution by corrosion; a plurality of temperature-responsive sensors located at predetermined locations in said unit for monitoring the temperature at said locations, said temperature-responsive sensors producing an electrical signal varying with the temperature at said location; electrical signal leads connected to said temperature-responsive sensors at said locations, respectively; and narrow flexible conduit means providing the only connection between the surface of the earth and said primary flow path means for said fission products solution, said gas-duct means for said protective gas and said electrical signal leads for said temperature-responsive means, respectively.

4. A nuclear reactor assembly for underground installation in a drill hole or shaft, comprising in combination a self-stabilized homogeneous nuclear reactor having reflector means and shield means and being mounted at an underground location, said drill hole having a predetermined diameter portion and an enlarged diameter portion at said location, said reflector means being assembled in said enlarged diameter portion and having an installed diameter greater than that of the predetermined diameter portion of said drill hole; heat-exchanger means joined with said reactor at said location and forming an underground unit therewith; primary flow path means in said nuclear reactor and said heat-exchanger means for naturally circulating a nuclear fuel solution through the same; secondary flow path means in said heat-exchanger means for circulating a secondary fluid in counterflow with respect to the flow of said fission products solution through said primary flow path means; gas-duct means for conveying protective gas in said assembly; a plurality of temperature-responsive sensors located at predetermined locations in said unit for monitoring the temperature at said locations; electrical signal leads connected to said temperature-responsive sensors at said predetermined locations, respectively; and narrow flexible conduit means providing the only connection between the surface of the earth and said primary flow path means for said fission products solution, said gas-duct means for said protective gas and said electrical signal leads for said temperature-responsive means, respectively.

5. A nuclear reactor assembly for underground installation in a drill hole or shaft, comprising in combination a self-stabilized homogeneous nuclear reactor having reflector means and shield means and being mounted at an underground location, and also having a reactor vessel and a bell-shaped guide means for guiding the flow of said nuclear fuel solution within said reactor vessel, said bell-shaped guide means being connected with a stand pipe and having an open end extending downwardly into the lower half of the reactor vessel; heat-exchanger means joined with said reactor at said location and forming an underground unit therewith; primary flow path means in said nuclear reactor and said heat-exchanger means for naturally circulating a nuclear fuel solution through the same; secondary flow path means in said heat-exchanger means for circulating a secondary fluid in counterflow with respect to the flow of said nuclear fuel solution through said primary flow path means; gas-duct means for conveying protective gas in said assembly; a plurality of temperature-responsive sensors located at predetermined locations in said unit for monitoring the temperature at said locations; electrical signal leads connected to said temperature-responsive sensors at said predetermined locations, respectively; and narrow flexible conduit means providing the only connection between the surface of the earth and said primary flow path means for said fission products solution, said gas-duct means for said protective gas and said electrical signal leads for said temperature-responsive means, respectively.

6. A nuclear reactor assembly for underground installation in a drill hole or shaft, comprising in combination a self-stabilized homogeneous nuclear reactor having reflector means and shield means and being mounted at an underground location; heat-exchanger means joined with said reactor at said location and forming an underground unit therewith; primary flow path means in said nuclear reactor and said heat-exchanger means for naturally circulating a nuclear fuel solution through the same; secondary flow path means in said heat-exchanger means for circulating a secondary fluid countercurrent to the flow of said fission products solution through said primary flow path means; gas-duct means for conveying protective gas in said unit; a plurality of temperature-responsive sensors located at predetermined locations in and forming part of said assembly for monitoring the temperature at said locations; electrical signal leads connected to said temperature-responsive sensors at said locations, respectively; and narrow flexible conduit means providing the only connection between said primary flow path means for said fission products solution, said gas-duct means for said protective gas and said electrical signal leads for said temperature-responsive sensors and the surface of the earth, said conduit means including a narrow pipeline extending into the lower half of said reactor vessel for feeding nuclear fuel solution therein.

7. A nuclear reactor assembly for underground installation in a drill hole or shaft, comprising in combination a self-stabilized homogeneous nuclear reactor having reflector means and shield means and being mounted at an underground location, and also having a reactor vessel and a bell-shaped guide means for guiding the flow of said nuclear fuel solution within said reactor vessel, said bell-shaped guide means being connected with a stand pipe and having an open end extending downwardly into the lower half of said reactor vessel; heat-exchanger means joined with said reactor at said location and forming an underground unit therewith; primary flow path means in said nuclear reactor and said heat-exchanger means for naturally circulating a nuclear fuel solution through the same, said stand pipe being located above said reactor vessel, said heat-exchanger means comprising a distributor head and a plurality of down pipes forming part of said primary flow path means connected to said stand pipe through said distributor head, said down pipes extending helically in a downward direction and opening into said reactor vessel outside of said bell-shaped flow guide means; secondary flow path means in said heat-exchanger means for circulating a secondary fluid around said distributor head and in counterflow with respect to the flow of said fission products solution through said primary flow path means; gas-duct means for conveying protective gas in and forming part of said assembly; a plurality of temperature-responsive sensors located at predetermined locations in and forming part of said assembly for monitoring the temperature at said locations; electrical signal leads connected to said temperature-responsive sensors at said locations, respectively; and narrow flexible conduit means providing the only connection between said primary flow path means for said nuclear fuel solution, said gas-duct means for said protective gas and said electrical signal leads for said temperature-responsive sensors and the surface of the earth.

8. A nuclear reactor assembly for underground installation in a drill hole or shaft, comprising in combination a self-stabilized homogeneous nuclear reactor having reflector means and shield means and being mounted at an underground location; heat-exchanger means joined with said reactor at said location and forming an underground unit therewith; primary flow path means in said nuclear reactor and said heat-exchanger means for naturally circulating a nuclear fuel solution through the same and including a plurality of down pipes in said heat-exchanger means extending helically in a downward direction and opening into said reactor vessel; secondary flow path means in said heat-exchanger means for circulating a secondary fluid in counterflow with respect to the flow of said fission products solution through said primary flow path means, said secondary flow path means comprising a plurality of band-shaped spacer supports supporting said down pipes in spaced relation to one another and also substantially helically arranged for guiding the secondary fluid substantially perpendicularly to said down pipes; gas-duct means for conveying protective gas in said unit; a plurality of temperature-responsive sensors located at predetermined locations in said unit for monitoring the temperature at said locations; electrical signal leads connected to said temperature-responsive sensors at said predetermined locations, respectively; and narrow flexible conduit means providing the only connection between said primary flow path means for said nuclear fuel solution, said gas-duct means for said protective gas and said electrical signal leads for said temperature-responsive sensors and the surface of the earth.

9. A nuclear reactor assembly for underground installation in a drill hole or shaft, comprising in combination a self-stabilized homogeneous nuclear reactor having reflector means and shield means and being mounted at an underground location; heat-exchanger means joined with said reactor at said location and forming an underground unit therewith, said exchanger means comprising an elongated cylindrical body having an annular chamber; primary flow path means in said nuclear reactor and heat-exchanger means unit for naturally circulating a primary nuclear fuel solution through the same, said primary flow path means comprising a plurality of down pipes mounted within the annular chamber of said heat-exchanger means; secondary flow path means in said heat-exchanger means for circulating a secondary fluid countercurrent to the flow of said nuclear fuel solution through said primary flow path means, said secondary flow path means including an irradiating chamber in said heat-exchanger means located above and communicating with said annular chamber, said irradiating chamber being wider than said annular chamber and being capable of receiving the secondary fluid whereby radiochemical processes may be effected in the secondary fluid by irradiation from said primary solution; gas-duct means for conveying protective gas in said unit; a plurality of temperature-responsive sensors located at predetermined locations in said unit for monitoring the temperature at said locations; electrical signal leads connected to said temperature-responsive sensors at said predetermined locations, respectively; and narrow flexible conduit means providing the only connection between said primary flow path means for said nuclear fuel solution, said gas-duct means for said protective gas and said electrical signal leads for said temperature-responsive sensors and the surface of the earth.

10. A nuclear reactor assembly according to claim 1, wherein said nuclear reactor has a large negative temperature coefficient so that said reactor is controllable by only varying the concentration of the nuclear fuel solution.

11. A nuclear reactor assembly for underground installation in a drill hole or shaft, comprising in combination a self-stabilized homogeneous nuclear reactor having reflector means and shield means and being mounted at an underground location; heat-exchanger means joined with said reactor at said location and forming an underground unit therewith; primary flow path means in said combined nuclear reactor and heat-exchanger means unit for naturally circulating a homogeneous nuclear fuel solution as primary fluid through the same; secondary flow path means in said heat-exchanger means for circulating a cooling medium secondary fluid in crossed counterflow with respect to the flow of said primary fluid; gas-duct means for conveying protective gas in said assembly; a plurality of temperature-responsive sensors located at predetermined locations in said assembly for monitoring the temperature at said locations, one of said temperature-responsive sensors being located respectively at the primary and secondary fluid inlets to said heat-exchanger means and at least another of said sensors respectively at the primary and secondary fluid outlets to said heat-exchanger means for monitoring the respective temperatures of said homogeneous fission products solution and said cooling medium; electrical signal leads connected to said temperature-responsive sensors at said locations, respectively; and narrow flexible conduit means providing the only connection between the surface of the earth and said primary flow path means, said gas-duct means and said electrical signal leads.

References Cited by the Examiner

UNITED STATES PATENTS

| 2,837,476 | 6/1958 | Busey | 176—47 |
| 2,874,106 | 2/1959 | Hammond | 176—48 |
| 3,126,055 | 3/1964 | Hanson | 166—39 |
| 3,127,319 | 3/1964 | Natland | 176—39 |

FOREIGN PATENTS

| 217,265 | 8/1956 | Australia. |
| 345,085 | 4/1960 | Switzerland. |

REUBEN EPSTEIN, *Primary Examiner.*

CARL D. QUARFORTH, *Examiner.*